United States Patent [19]

Foley et al.

[11] 4,003,173
[45] Jan. 18, 1977

[54] WALL CONSTRUCTION

[75] Inventors: Kevin M. Foley, Toledo; Harold A. Dewhurst; Frank P. McCombs, both of Granville, all of Ohio

[73] Assignee: Owens-Corning Fiberglas Corporation, Toledo, Ohio

[22] Filed: Sept. 29, 1975

[21] Appl. No.: 617,353

[52] U.S. Cl. .............................. 52/309.17; 138/174; 220/1 B
[51] Int. Cl.² ........................................ E04C 2/16
[58] Field of Search ............. 138/174; 52/309, 245; 220/9 R, 3, 9 A, 1 B

[56] References Cited

UNITED STATES PATENTS

| 3,607,511 | 9/1971 | Grosh | 138/174 |
| 3,871,409 | 3/1975 | Gilbu | 138/174 |

Primary Examiner—John E. Murtagh
Attorney, Agent, or Firm—John W. Overman; Patrick P. Pacella

[57] ABSTRACT

We have found that if we add a polyhydric phenolic compound such as resorcinol to monohydric phenolic resin/cement systems, we can shorten the gel time sufficiently to use the systems in producing walls. The walls generally are cylindrical and serve to confine a liquid. These systems are especially good for producing large diameter, continuous pipe.

10 Claims, 1 Drawing Figure

U.S. Patent  Jan. 18, 1977  4,003,173
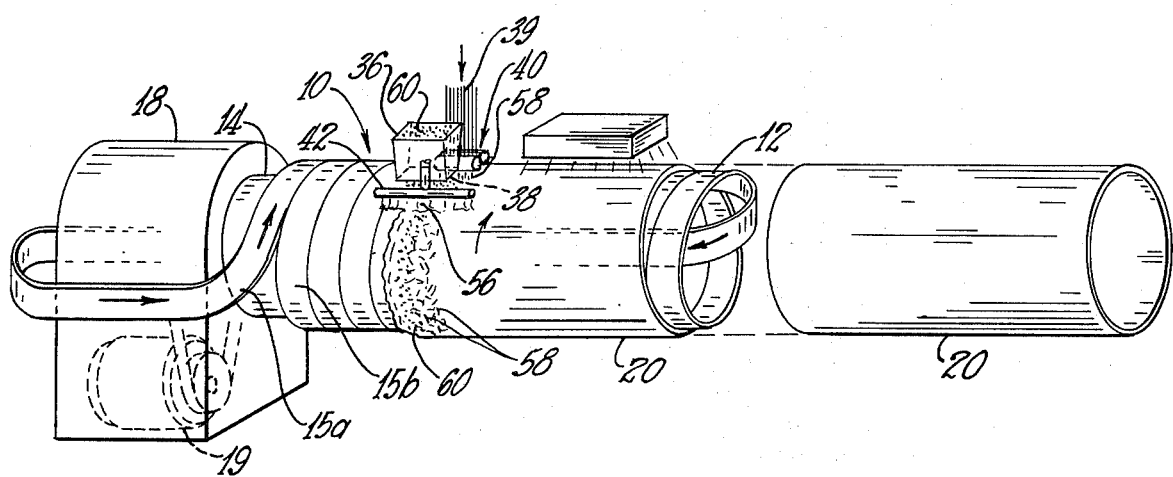

WALL CONSTRUCTION

This invention relates to cement/phenolic resin systems for the continuous production of plastic tubing.

The art has long recognized the desirability of using non-metallic underground storage tanks to avoid the corrosion which inevitably occurs in metal conduits. Glass fiber reinforced synthetic resins such as polyester resins have comprised the conventional resin systems for these storage tanks.

Recently, the industry has been producing these tanks on a mandrel comprising an endless metal band which is helically wound in abutting convolutions about a central support to form a cylindrical forming surface. U.S. Pat. No. 3,464,879 describes these continuous ribbon forming mandrels. The endless band extends back through the center of the support to connect the ends of the helix. The bank advances continuously to provide a forming surface which both rotates about its axis and moves longitudinally along its axis.

FIG. 1 of U.S. Pat. No. 3,886,338 does a particularly good job of picturing this continuous ribbon mandrel.

The mandrel is useful for making large diameter tubular structures such as pipes, tanks, manholes, silos, and the like. The unique design of the mandrel makes it possible to produce tubing in continuous or indefinite lengths.

One problem with this process is the short cure times for the resin systems it employs. These tubular structures must harden quickly because the mandrel is continually rotating as well as advancing longitudinally. It is not enough that the materials be solids. They must quickly cure to a hardened mass, especially by the time the continuous pipe reaches the open end of the mandrel.

To date, we know of no instance where the industry has used phenolic resin/cement systems on such a machine.

We now have discovered that if we add a polyhydric phenolic compound to monohydric phenolic resin/cement systems, we can shorten the gel time sufficiently to use phenolic resins on these continuous mandrels.

We use the term "polyhydric phenolic compound" to cover polyhydric phenols per se, such as resorcinol, catechol, and hydroquinone and their substitution products and derivatives. While we prefer dihydric phenolic compounds, we can use trihydric phenolic compounds of copolymerization products of mono, di, and trihydric phenols. We especially prefer resorcinol.

The resins we employ are phenol-formaldehyde condensates or phenol-amino compound-formaldehyde condensates. The amino compounds we employ generally are urea, melamine, or dicyandiamide.

A detailed discussion of phenol-formaldehyde condensates appears in *The Chemistry of Phenolic Resins*, Martin, John Wiley & Sons, Inc., 1956, and cited references.

The cements we employ are inorganic cements such as hydraulic cements. Hydraulic cements are powder mixtures made from silica, alumina, lime, iron oxide, and magnesia, which harden when mixed with water. They include Portland calcium-aluminate, magnesia, natural, masonary, pozzolan, and slag cements.

We also can employ gypsum with the cements.

To produce a hydrated cement, we can agitate ground cement clinker in a water slurry for a period of time. We then dry the hydrate.

The resin and cement have a weight ratio of resin to cement ranging from 1:9 to 9:1 based on the dry weight of cement and the weight of resin solids.

The amount of water present need only be sufficient to cure the cement. It may be necessary to add additional water or remove some of the water of reaction.

We also can add glass fibers in an amount greater than 0 and up to about 60 weight percent of molding compound. We can use continuous glass strand or chopped glass fiber or both. Preferably, we incorporate mostly chopped glass fiber with a small amount of continuous strand.

In addition, we can include a silane coupling agent or a mixture of silane coupling agents in a total amount of from about 0.01 to about 5 percent by weight of molding compound to increase the strength properties of the resulting moldings. Particularly suitable silane coupling agents are "A-1100" and "Tetraethyl Orthosilicate," commercially available from Union Carbide Corporation. A-1100 is gamma-aminopropyltriethoxysilane and Tetraethyl Orthosilicate is tetraethoxysilane.

With regard to the continuous production of tubing, we generally employ a particulate filler such as sand. The amount of filler ranges from 0 to 150 parts of sand per part of molding compound.

The mole ratio of the polyhydric phenolic compound to the phenol in the resin ranges from 1:10 to 10:1. Preferably, this ratio ranges from 1:4 to 10:1.

In the cylindrical wall construction of this invention, the thermosetting resin matrix comprises from 30 to 40 weight percent of the wall, glass fibers comprise 10 to 20 weight percent of the wall, and the filler comprises 20 to 50 weight percent of the wall.

The FIGURE shows an endless ribbon mandrel for the continuous production of plastic tubing. The FIGURE also shows the use of this invention in association with the mandrel.

The endless mandrel 10, shown in the FIGURE, comprises an endless steel band 12 which recirculates about a core 14. The core is supported at the head of the machine 18, which also includes a drive 19 for the mandrel. The core is not supported at the opposite end. The major portion of the band is helically wrapped in abutting convolutions 15a and 15b around the periphery of the core to form a generally smooth forming surface on which materials can be applied. The band advances from the supported end of the core to the free end where it passes back through the center of the core to the supported end.

A continuously formed cylindrical wall 20 is built on the mandrel 10 from a combination of chopped glass fibers, a particulate filler, and resin. The sand or other pulverulent filler is fed from an overhead hopper 36 having a downwardly directed opening 38. The chopped glass fibers are supplied from continuous glass filaments 39 to a chopper 40. Thermosetting resin is fed from a conventional resin sprinkler 42 having a plurality of downwardly opening apertures.

It will be appreciated that the concurrent supply of resin 56, chopped glass fibers 58, and sand 60 to the surface of mandrel 10 will result in the build up of successive layers of each material as the mandrel surface advances. The resin impregnating the glass and sand and embedding the glass and sand in a resin matrix.

The method of this invention includes the steps of applying a filler (sand and cement) to a continuously rotating cylindrical form, distributing glass fibers in random orientation and then adding the resin and ployhydric phenolic compound while continuing the rotation of the form, and heating the cylindrical wall to cure the thermosetting resin. The resultant cylindrical wall is able to withstand the substantial forces encountered in underground installation and avoids cracking or the building of stresses encountered in curing of the thermosetting resin.

The mandrel rotates at approximately 5 RPM's. The steel band moves from left to right for each revolution of the mandrel. Each of the three applicator stations is approximately 11 band widths wide so that the finished product contains 11 layers. These systems are especially good for producing large diameter, continuous pipe.

U.S. Pat. No. 3,871,409 describes this method more completely.

If desired, the molding compounds of our invention also can be incorporated into either a sheet molding compound (SMC) or a bulk molding compound (BMC), which contain glass fibers. We cure the resulting molded articles with or without glass fibers in a hot air oven by conventional means. Or, if the systems cure themselves, no heating is necessary.

The following examples further illustrate our invention.

EXAMPLE I

In a typical method of this invention such as we just described, we at the first station applied a mixture of 70 parts by weight of sand and 41.1 parts by weight of Portland cement to the continuously rotating cylindrical form. At the next station, we applied 70 parts by weight of chopped glass fiber (E glass). At the third station, we applied a mixture of 9.4 parts by weight of phenol and 17.3 parts by weight of 52% formaldehyde. We then heated the mandrel to cure the system.

The reaction gelled after 53 minutes.

EXAMPLE II

We repeated the procedure of Example I except that we employed 2.20 parts by weight of resorcinol and 7.52 parts by weight of phenol instead of the 9.4 parts by weight of phenol.

The reaction gelled after 53 seconds. The mole ratio of resorcinol to phenol was 1 to 4.

EXAMPLE III

We mixed 9.4 grams (0.1 mole) of phenol, 17.3 grams (0.3 mole) of formaldehyde, and 41.1 grams of Portland cement together in a beaker. The reaction gelled after 53 minutes. We made other mixtures like this one except that we employed various mole ratios of resorcinol and phenol. The results were as follows:

| Moles of Resorcinol | Moles of Phenol | Gel Time |
| --- | --- | --- |
| 0 | 0.1 | 53 minutes |
| 0.005 | 0.095 | 35 minutes |
| 0.01 | 0.09 | 29 minutes |
| 0.02 | 0.08 | 53 seconds |
| 0.03 | 0.07 | 39 seconds |
| 0.04 | 0.06 | 36 seconds |
| 0.09 | 0.01 | 10 seconds |

These examples clearly show that we can use polyhydric phenolic compounds to accelerate the gel time of our phenolic/cement system. These systems are especially good for producing large diameter, continuous pipe.

We intend to include modification and variations within the scope and spirit of our invention.

We claim:

1. A wall consisting essentially of:
   a. a thermosetting resin cured and comprising from about 30 to 40 percent by weight of said wall;
   b. glass fibers randomly oriented and substantially uniformly distributed through said resin, comprising from about 10 to 20 percent by weight of said wall;
   c. a filler uniformly distributed in said resin comprising about 15 to 60 percent of said wall;
   d. inorganic cement; and
   e. at least one polyhydric phenolic compound
   wherein the resin is phenol-formaldehyde condensate or a phenol-amino compound-formaldehyde condensate formed in the presence of the cement and the polyhydric phenolic compound,
   wherein the resin and cement have a weight ratio of resin to cement ranging from 1:9 to 9:1 based on the dry weight of cement and the weight of resin solids, and
   wherein the polyhydric phenolic compound and the phenol in the resin have a mole ratio polyhydric phenolic compound to phenol ranging from 1:10 to 10:1.
2. A wall according to claim 1 wherein the wall is cylindrical and served to confine a liquid.
3. A wall according to claim 2 in the form of large diameter continuous pipe.
4. A wall according to claim 1 wherein the filler is sand.
5. A wall according to claim 1 wherein the mole ratio of the polyhydric phenolic compound to phenol ranges from 1:4 to 10:1.
6. A wall according to claim 1 wherein the polyhydric phenolic compound is resorcinol, catechol, or hydroquinone.
7. A wall according to claim 1 wherein the polyhydric phenolic compound is resorcinol.
8. a wall according to claim 1 wherein the glass fibers are mostly chopped glass fibers.
9. A wall according to claim 1 wherein the cement is hydraulic cement.
10. A wall according to claim 1 wherein the cement is Portland cement.

* * * * *